(12) United States Patent
Jordan, III et al.

(10) Patent No.: US 10,807,600 B2
(45) Date of Patent: Oct. 20, 2020

(54) VEHICLE AND VEHICLE EMULATOR

(71) Applicant: FORD GLOBAL TECHNOLOGIES, LLC, Dearborn, MI (US)

(72) Inventors: Dale F. Jordan, III, Royal Oak, MI (US); Fernando Villavicencio, Livonia, MI (US); Brendan Jenkins, Novi, MI (US); Dominic Gelfuso, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 65 days.

(21) Appl. No.: 15/789,680

(22) Filed: Oct. 20, 2017

(65) Prior Publication Data
US 2019/0118815 A1    Apr. 25, 2019

(51) Int. Cl.
| | | |
|---|---|---|
| B60W 30/00 | (2006.01) |
| B60W 30/182 | (2020.01) |
| B60K 35/00 | (2006.01) |
| B60K 37/02 | (2006.01) |
| B60L 15/20 | (2006.01) |
| B60Q 5/00 | (2006.01) |
| B60W 10/08 | (2006.01) |
| B60W 10/20 | (2006.01) |
| B60W 10/22 | (2006.01) |
| B60W 50/08 | (2020.01) |
| B60W 50/14 | (2020.01) |

(52) U.S. Cl.
CPC ......... *B60W 30/182* (2013.01); *B60K 35/00* (2013.01); *B60K 37/02* (2013.01); *B60L 15/20* (2013.01); *B60Q 5/008* (2013.01); *B60W 10/08* (2013.01); *B60W 10/20* (2013.01); *B60W 10/22* (2013.01); *B60W 50/082* (2013.01); *B60W 50/14* (2013.01); *B60K 2370/52* (2019.05); *B60K 2370/95* (2019.05); *B60L 2240/423* (2013.01); *B60L 2250/16* (2013.01); *B60L 2260/20* (2013.01); *B60W 2050/146* (2013.01); *B60W 2540/215* (2020.02); *B60W 2710/085* (2013.01); *B60W 2710/202* (2013.01); *B60W 2710/223* (2013.01); *B60Y 2306/11* (2013.01); *B60Y 2410/132* (2013.01)

(58) Field of Classification Search
None
See application file for complete search history.

(56) References Cited

U.S. PATENT DOCUMENTS

| | | | | |
|---|---|---|---|---|
| 4,680,959 A | * | 7/1987 | Henry | G01M 15/044 703/8 |
| 5,905,349 A | * | 5/1999 | Farkas | B60L 7/18 318/139 |

(Continued)

FOREIGN PATENT DOCUMENTS

| | | |
|---|---|---|
| WO | 2010000532 A2 | 1/2010 |
| WO | 2017067570 A1 | 4/2017 |

*Primary Examiner* — Truc M Do
(74) *Attorney, Agent, or Firm* — David Kelley; Brooks Kushman P.C.

(57) ABSTRACT

A vehicle includes a vehicle subsystem, a user interface, and a controller. The user interface is configured to display a plurality of selectable vehicle models. The controller is programmed to, in response to a selection of a particular vehicle model, adjust a parameter of the subsystem to emulate a corresponding subsystem parameter of the particular vehicle model.

18 Claims, 2 Drawing Sheets

(56) References Cited

U.S. PATENT DOCUMENTS

| | | | |
|---|---|---|---|
| 8,862,346 B2* | 10/2014 | Saltsman | G01M 17/007 |
| | | | 701/51 |
| 9,115,803 B2* | 8/2015 | Fujii | F16H 61/0213 |
| 9,365,158 B2 | 6/2016 | Barlow, Jr. et al. | |
| 9,430,886 B2* | 8/2016 | Yano | G07C 5/0808 |
| 9,639,995 B2* | 5/2017 | Cacabelos | G07C 5/0808 |
| 10,056,008 B1* | 8/2018 | Sweany | G09B 19/167 |
| 10,093,324 B1* | 10/2018 | Szybalski | B60W 50/14 |
| 10,289,651 B2* | 5/2019 | McQuade | F02D 29/02 |
| 2003/0004032 A1* | 1/2003 | Tamor | B60K 6/547 |
| | | | 477/5 |
| 2005/0192736 A1* | 9/2005 | Sawada | G09B 9/05 |
| | | | 701/117 |
| 2005/0268708 A1* | 12/2005 | Satou | B60T 8/172 |
| | | | 73/146 |
| 2007/0260373 A1* | 11/2007 | Langer | G01M 17/007 |
| | | | 701/31.4 |
| 2007/0260438 A1* | 11/2007 | Langer | G01M 17/007 |
| | | | 703/8 |
| 2008/0060861 A1 | 3/2008 | Baur et al. | |
| 2012/0083958 A1* | 4/2012 | Ballard | B60W 10/06 |
| | | | 701/22 |

\* cited by examiner

VEHICLE AND VEHICLE EMULATOR

TECHNICAL FIELD

The present disclosure relates to vehicles and control systems for vehicles, including hybrid and electric vehicles.

BACKGROUND

Vehicles may include systems for controlling the operation of the vehicle and/or controlling the operation of various subsystems of the vehicle.

SUMMARY

A vehicle includes a vehicle subsystem, a user interface, and a controller. The user interface is configured to display a plurality of selectable vehicle models. The controller is programmed to, in response to a selection of a particular vehicle model, adjust a parameter of the subsystem to emulate a corresponding subsystem parameter of the particular vehicle model.

A vehicle includes a vehicle subsystem, a user interface, and a controller. The user interface is configured to display a plurality of selectable engine models. The controller is programmed to, in response to a selection of a particular engine model, adjust a parameter of the subsystem to emulate a corresponding subsystem parameter of the particular engine model.

A vehicle includes a vehicle subsystem, a user interface, and an emulator. The user interface is configured to display a plurality of selectable vehicle models. The emulator is programmed to, in response to a selection of a particular vehicle model, adjust a parameter of the subsystem to emulate a corresponding subsystem parameter of the particular vehicle model.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
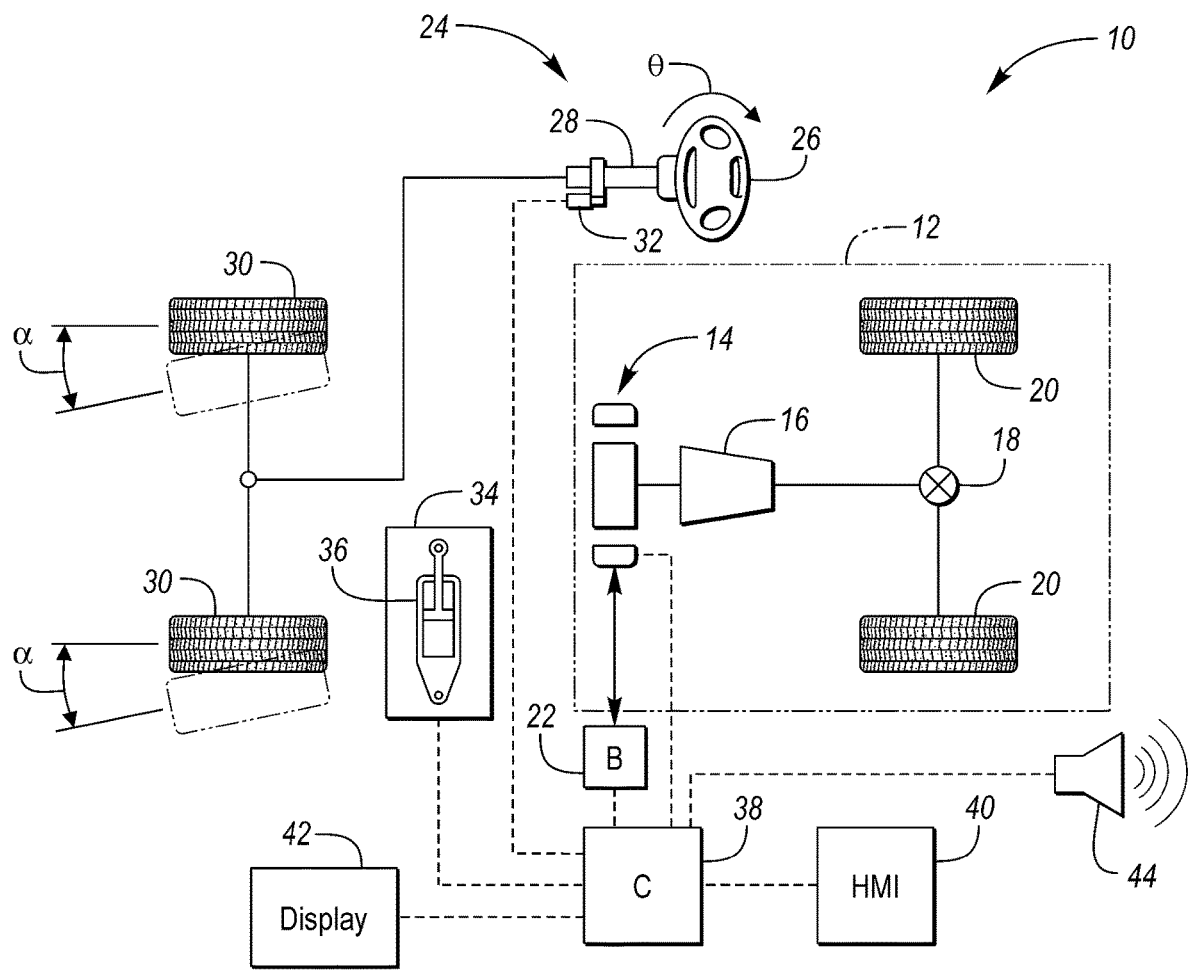
FIG. 1 is a schematic illustration of a representative vehicle.

Referring to FIG. 1, a representative vehicle 10 is illustrated. The vehicle 10 includes a powertrain 12. The powertrain 12 may include a power generator that is configured to generate torque within the powertrain 12, such as an electric machine 14 (e.g., electric motor), gearbox 16, differential 18, drive wheels 20, and various other components such as gears or driveshafts. The gearbox 16 may be a multi-ratio transmission that provides multiple gear ratios between the input and output of the gearbox 16. Alternatively, the gearbox 16 may only provide one gear ratio between the input and output of the gearbox 16. The electric machine 14 may receive electric power from a battery 22 in response to a desired torque and/or power output of the electric machine 14. The vehicle operator may request a desired torque and/or power output of the electric machine by depressing an accelerator pedal (not shown). The electric machine 14 may also be configured to recharge the battery 22 during a deceleration event where the vehicle operator is applying a brake pedal (not shown).

The vehicle 10 may include a power steering system 24. The power steering system 24 includes a steering wheel 26, a steering column 28, a pair of steered wheels 30, and various linkages (not shown) such as tie rods, sway bars, gears, etc. that connect the steering column 28 to the steered wheels 30. Alternatively, the power steering system 24 may be a steer-by-wire steering system that does not include any direct mechanical linkages between the steering wheel 26 and the steered wheels 30. The power steering system 24 includes a steering ratio that refers to the ratio between the angular displacement $\theta$ of the steering wheel relative to a resulting angular displacement $\alpha$ of the steered wheels 30 when the steering wheel 26 is being turned. The power steering system 24 maybe an electronic power steering system that includes an electric motor 32 that is configured to deliver torque to the steering column 28. The electric motor 32 may deliver torque to the steering column by a gearing arrangement, a belt and pulley system, or by any other mechanical system known in the art.

A suspension system 34 of the vehicle 10 may be configured to absorb any shock that may be caused when the wheels of the vehicle 10 travel over an uneven surface, such as a pothole. Specifically, the suspension system 34 may include several shock absorbers or dampers 36 to absorb any shock caused by the wheel traveling over the uneven surface. The dampers 36 may be disposed between the wheels and the frame or body of the vehicle 10. The stiffness (i.e., the rigidity of an object or the extent at which an object resists deformation in response to an applied force) of the dampers 36 may be increased or decreased. For example, if the dampers are fluid actuated, the stiffness may be adjusted by altering a pressure of a fluid (e.g., air) within the dampers 36. Increasing the pressure of the fluid would result in increasing the stiffness of the dampers 36 while decreasing the pressure of the fluid result in decreasing the stiffness of the dampers 36. The suspension system 34 may include actuators, such as a pump and a valve, that direct fluid into and out of the dampers 36 to increase and decrease the pressure of the fluid within the dampers 36, respectively.

Alternatively, the dampers 36 may be part of a magnetic ride control system where the stiffness may be adjusted by altering a magnetic field that interacts with iron particles suspended in a fluid within the dampers 36. In a magnetic ride control system, the dampers 36 are filled with magnetorheological fluid, which is a mixture of easily magnetized iron and hydrocarbon oil. Each of the dampers 36 includes a piston that includes electromagnetic coils and small fluid passages extending through the piston. The electromagnets are able to create a variable magnetic field across the fluid passages. When the magnets are off, the fluid travels through the passages freely. However, when the magnets are turned on, the iron particles in the fluid create a fibrous structure through the passages in the same direction of the magnetic field. The strength of the bonds between the magnetized iron particles causes the viscosity of the fluid to increase resulting in a stiffer suspension.

A controller 38 may be in communication with and configured to control various subsystems of the vehicle including the electric machine 14, the battery 22, the power steering system 24 (including the electric motor 32), and the suspension system 34 (including the dampers 36 and/or any actuators configured to increase and/or decrease the stiffness of the dampers 36). The controller 38 may also be in communication with a user interface (or human machine interface) 40, a dashboard display screen 42 that is positioned along a dashboard of the vehicle 10, and one or more speakers 44 that may be located in an interior cabin of the vehicle 10 or on an exterior of the vehicle 10.

While illustrated as one controller, the controller 38 may be part of a larger control system and may be controlled by various other controllers throughout the vehicle 10, such as a vehicle system controller (VSC). It should therefore be understood that the controller 38 and one or more other controllers can collectively be referred to as a "controller" that controls various actuators in response to signals from various sensors to control functions the vehicle 10 or vehicle subsystems. The controller 38 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 38 in controlling the vehicle 10 or vehicle subsystems.

Control logic or functions performed by the controller 38 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description.

The control logic may be implemented primarily in software executed by a microprocessor-based vehicle and/or powertrain controller, such as controller 38. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The controller 38 may be configured to receive various states or conditions of the various vehicle components illustrated in FIG. 1 via electrical signals. The electrical signals may be delivered to the controller 38 from the various components via input channels. Additionally, the electrical signals received from the various components may be indicative of a request or a command to change or alter a state of one or more of the respective components of the vehicle 10. The controller 38 includes output channels that are configured to deliver requests or commands (via electrical signals) to the various vehicle components. The controller 38 includes control logic and/or algorithms that are configured to generate the requests or commands delivered through the output channels based on the requests, commands, conditions, or states of the various vehicle components. The input channels and output channels are illustrated as dotted lines in FIG. 1. It should be understood that a single dotted line may be representative of both an input channel and an output channel into or out of a single element. Furthermore, an output channel out of one element may operate as an input channel to another element and vice versa.

The user interface 40 may be configured to display a plurality of selectable vehicle models. The selectable vehicle models may be categorized by make (e.g., Ford Motor Company), model (e.g., Mustang, F-150, Fusion, Taurus, etc.), and year (e.g., 1967, 1982, etc.). The controller 38 may be programmed to, in response to a selection of a particular vehicle model via the user interface 40, adjust a parameter of one or more of the vehicle subsystems (e.g., electric machine 14, power steering system 24, suspension system 34, etc.) to imitate, mimic, or emulate a corresponding subsystem parameter of the selected particular vehicle model. The controller 38 may also be referred as an emulator since the controller 38 may be controlling one or more subsystems of the vehicle 10 to imitate a corresponding system of another vehicle model.

Alternatively, the user interface 40 could be configured to display a plurality of selectable internal combustion engine models (e.g., 5.0-liter engine) and the controller 38 could be programmed to, in response to a selection of a particular internal combustion engine model via the user interface 40, adjust a parameter of one or more of the vehicle subsystems to imitate, mimic, or emulate a corresponding subsystem parameter of the selected particular internal combustion engine model.

Figure 2:
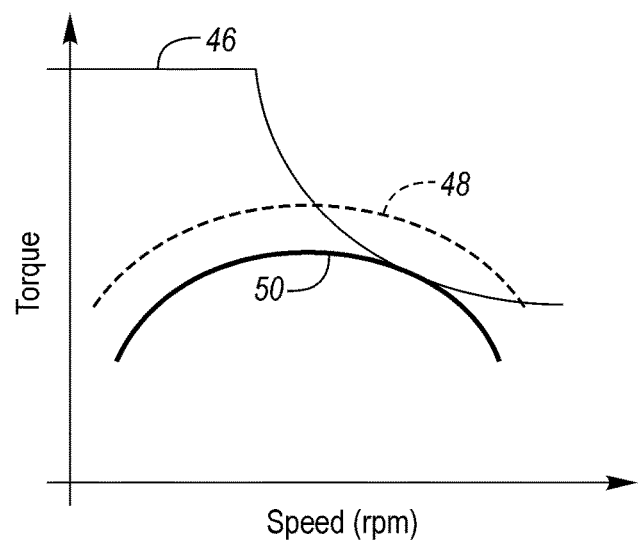
FIG. 2 is a graph illustrating torque profiles of an electric motor and an internal combustion engine relative to rotational speed.

The controller 38 may be programmed to adjust a commanded torque of the electric machine 14 (i.e., a parameter a vehicle subsystem) to emulate an engine torque profile (i.e., a corresponding subsystem parameter) of a particular vehicle or internal combustion engine model in response to the selection of the particular vehicle or internal combustion engine model via the user interface 40. If the engine torque profile of the particular vehicle or internal combustion engine model exceeds a torque output limit of the electric machine 14, the controller 38 may be programmed to adjust the torque of the electric machine 14 to emulate a scaled down version of the engine torque profile that does not exceed the torque output limit of the electric machine 14. For example and referring to FIG. 2, if the engine torque profile 48 of the selected particular vehicle or internal combustion engine model at some point exceeds a torque profile 46 of the electric machine 14, the torque of the electric machine 14 may be adjusted to emulate a scaled down version 50 of the engine torque profile that does not exceed the torque profile 46 of the electric machine 14. The scaled down version 50 of the engine torque profile may correspond to a maximum potential engine torque profile that does not exceed the torque profile 46 of the electric machine 14.

The controller 38 may also be programmed to intermittently adjust the torque of the electric machine 14 to simulate transmission gear shifting based on a shift schedule of the particular vehicle model in response to the command torque to the electric machine 14 and the selection of the particular vehicle model via the user interface 40. The one or more speakers 44 may also be activated by the controller 38 to emulate the engine sounds, transmission shifting sounds, or any other sounds typically generated by a powertrain of the particular vehicle model in response to the command torque to the electric machine 14 and/or the selection of the particular vehicle model via the user interface 40.

The controller 38 may be programmed to adjust a resistance torque of the power steering system 24 (i.e., a parameter a vehicle subsystem) to emulate a steering system resistance torque of the particular vehicle model (i.e., a corresponding subsystem parameter) in response to the selection of the particular vehicle model via the user interface 40. More specifically, the torque of the power steering system 24 may be adjusted to emulate the steering system resistance torque of the particular vehicle model by adjusting the resistance torque in the steering column 28 via the electric motor 32. The resistance torque of the power steering system 24 may refer to the resistance torque felt at the steering wheel 26 while turning the steering wheel 26.

The controller 38 may also be programmed to adjust a steering ratio of the power steering system 24 (i.e., a parameter a vehicle subsystem) to emulate a steering ratio of the particular vehicle model (i.e., a corresponding subsystem parameter) in response to the selection of the particular vehicle model via the user interface 40. In a steer-by-wire steering system, the parameters of the control logic of the steer-by-wire steering system could be adjusted so that the desired emulated steering ratio is obtained. In a steering system that requires mechanical linkages between the steering wheel and the steered wheels, the emulated steering ratio could be obtained by including a mechanism that shifts between a variety of gears (e.g., a gearbox) to obtain different steering ratios within the steering system.

The controller 38 may be programmed to adjust the stiffness of the dampers 36 of the suspension system 34 (i.e., a parameter a vehicle subsystem) to emulate a damper stiffness of the particular vehicle model (i.e., a corresponding subsystem parameter) in response to the selection of the particular vehicle model via the user interface 40. The stiffness of the dampers 36 may be adjusted by altering a pressure of a fluid within the dampers 36 (if the dampers are fluid actuated) or by altering a magnetic field that interacts with particles suspended in a fluid within the dampers 36 (if the dampers are part of a magnetic ride control system).

Figure 3:
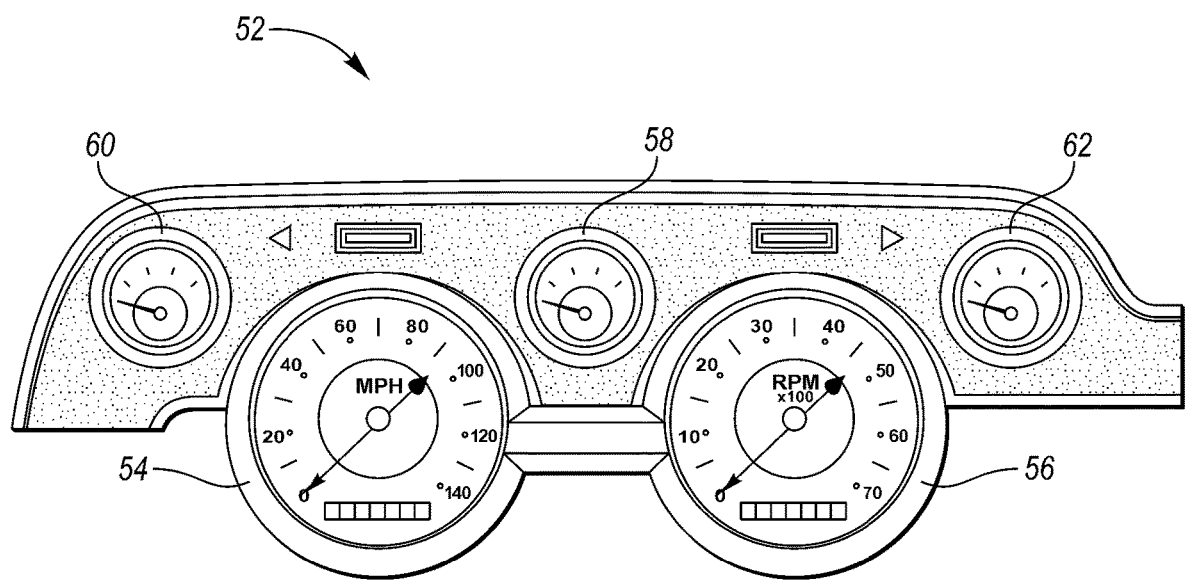
FIG. 3 is a representative dashboard gauge configuration of a vehicle.

The controller 38 may also be programmed activate the dashboard display screen 42 to display vehicle gauges based on a gauge layout of the particular vehicle model in response to the selection of the particular vehicle model via the user interface 40. Referring to FIG. 3, a representative dashboard gauge configuration of a selected the particular vehicle model is illustrated. The gauge layout may include the same aesthetic appearance as the gauge layout of the selected particular vehicle model. The gauge layout may also include the particular gauges included in the gauge layout of the particular vehicle model, including a speedometer 54, tachometer 56, fuel gauge 58, temperature gauge 60, battery voltage gauge 62, etc.

It should be understood that the vehicle configuration described herein is merely exemplary and is not intended to be limited. Other non-hybrid, electric, or hybrid vehicle configurations should be construed as disclosed herein. Other vehicle configurations may include, but are not limited to, vehicles powered by an internal combustion engine, micro-hybrid vehicles, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   a vehicle subsystem;
   a user interface configured to display a plurality of selectable vehicle models:
   wheels configured to move the vehicle between various locations;
   a controller programmed to, in response to a selection of a particular vehicle model, adjust a parameter of the subsystem to emulate a corresponding subsystem parameter of the particular vehicle model;
   wherein the subsystem is an electric machine configured to generate torque within a powertrain of the vehicle, the parameter is a commanded electric machine torque, and the corresponding subsystem parameter is an engine torque profile of the particular vehicle model; and
   wherein the controller is further programmed to, in response to the engine torque profile exceeding a torque output limit of the electric machine, adjust the electric machine torque to emulate a scaled version of the engine torque profile that does not exceed the torque output limit of the electric machine.

2. The vehicle of claim 1 further comprising a speaker, wherein the controller is further programmed to, in response to the commanded electric machine torque and the selection of a particular vehicle model, activate the speaker to emulate an engine sound of the particular vehicle model.

3. The vehicle of claim 2, wherein the speaker is located on an exterior of the vehicle.

4. The vehicle of claim 2, wherein the speaker is located on an interior of the vehicle.

5. The vehicle of claim 1, wherein the controller is further programmed to, in response to the commanded electric machine torque and the selection of the particular vehicle model, intermittently adjust the electric machine torque to simulate transmission gear shifting based on a shift schedule of the particular vehicle model.

6. The vehicle of claim 1, wherein the subsystem is a power steering system, the parameter is a resistance torque of the power steering system, and the corresponding subsystem parameter is a steering system resistance torque of the particular vehicle model.

7. The vehicle of claim 6, wherein the power steering system has an electric motor configured to generate torque in the power steering system and the resistance torque of the power steering system is adjusted to emulate the steering system resistance torque of the particular vehicle model via adjusting the torque of the electric motor.

8. The vehicle of claim 1, wherein the subsystem is a power steering system, the parameter is a steering ratio of the power steering system, and the corresponding subsystem parameter is a steering system ratio of the particular vehicle model.

9. The vehicle of claim 1, wherein the subsystem is a suspension system having adjustable dampers, the parameter is a stiffness of the dampers, and the corresponding subsystem parameter is a damper stiffness of the particular vehicle model.

10. The vehicle of claim 9, wherein the stiffness of the dampers is adjusted by altering a pressure of a fluid within the dampers.

11. The vehicle of claim 9, wherein the stiffness of the dampers is adjusted by altering a magnetic field that interacts with particles suspended within a fluid within the dampers.

12. The vehicle of claim 1 further comprising a dashboard display screen, wherein the controller is further programmed to, in response to the selection of the particular vehicle model, activate the display screen to display vehicle gauges based on a gauge layout of the particular vehicle model.

13. A vehicle comprising:
a vehicle subsystem;
a user interface configured to display a plurality of selectable engine models; and
wheels configured to move the vehicle between various locations;
a controller programmed to, in response to a selection of a particular engine model, adjust a parameter of the subsystem to emulate a corresponding subsystem parameter of the particular engine model;
wherein the subsystem is an electric machine configured to generate torque within a powertrain of the vehicle, the parameter is a commanded electric machine torque, and the corresponding subsystem parameter is an engine torque profile of the particular vehicle model; and
wherein the controller is further programmed to, in response to the engine torque profile exceeding a torque output limit of the electric machine, adjust the electric machine torque to emulate a scaled version of the engine torque profile that does not exceed the torque output limit of the electric machine.

14. The vehicle of claim 13, wherein the subsystem is an electric machine configured to generate torque within a powertrain of the vehicle, the parameter is a commanded electric machine torque, and the corresponding subsystem parameter is a torque profile of the particular engine model.

15. A vehicle comprising:
a vehicle subsystem;
a user interface configured to display a plurality of selectable vehicle models;
wheels configured to move the vehicle between various locations;
an emulator programmed to, in response to a selection of a particular vehicle model, adjust a parameter of the subsystem to emulate a corresponding subsystem parameter of the particular vehicle model;
wherein the subsystem is an electric machine configured to generate torque within a powertrain of the vehicle, the parameter is a commanded electric machine torque, and the corresponding subsystem parameter is an engine torque profile of the particular vehicle model; and
wherein the emulator is further programmed to, in response to the engine torque profile exceeding a torque output limit of the electric machine, adjust the electric machine torque to emulate a scaled version of the engine torque profile that does not exceed the torque output limit of the electric machine.

16. The vehicle of claim 15, wherein the subsystem is an electric machine configured to generate torque within a powertrain of the vehicle, the parameter is a commanded electric machine torque, and the corresponding subsystem parameter is an engine torque profile of the particular vehicle model.

17. The vehicle of claim 15, wherein the subsystem is a power steering system, the parameter is a resistance torque of the power steering system, and the corresponding subsystem parameter is a steering system resistance torque of the particular vehicle model.

18. The vehicle of claim 15, wherein the subsystem is a suspension system having adjustable dampers, the parameter is a stillness of the dampers, and the corresponding subsystem parameter is a damper stiffness of the particular vehicle model.

* * * * *